United States Patent [19]
Brown et al.

[11] Patent Number: 5,688,541
[45] Date of Patent: Nov. 18, 1997

[54] APPARATUS FOR PREVENTING HINDRANCE OF REMOVAL OF MOLDED PRODUCTS FROM MOLD DUE TO CONTACT WITH MOLD PARTS

[75] Inventors: Paul Philip Brown, Carlsbad, Calif.; Jens Ole Sorensen, Cayman Kai, Cayman Islands

[73] Assignee: Universal Ventures, Cayman Islands

[21] Appl. No.: 650,620

[22] Filed: May 20, 1996

[51] Int. Cl.$^6$ ............................................. B29C 45/40
[52] U.S. Cl. ............ 425/556; 264/334; 425/436 R; 425/436 RM; 425/441; 425/443; 425/588
[58] Field of Search ........................ 425/537, 556, 425/554, 441, 436 R, 443, 436 RM, 444, 588; 264/334, 335

[56] References Cited

U.S. PATENT DOCUMENTS

| | | |
|---|---|---|
| 2,420,405 | 5/1947 | Alves ............................... 425/588 |
| 2,984,862 | 5/1961 | Chabotte .......................... 425/588 |
| 3,852,011 | 12/1974 | Maiocco . |
| 3,910,740 | 10/1975 | Rees . |
| 3,914,081 | 10/1975 | Aoki .................................. 425/588 |
| 4,372,740 | 2/1983 | Kuramochi et al. ............ 425/588 |
| 4,422,998 | 12/1983 | Sorensen ......................... 264/335 |
| 5,009,587 | 4/1991 | Corvaglia et al. ............. 425/588 |

*Primary Examiner*—Jay H. Woo
*Assistant Examiner*—Joseph Leyson
*Attorney, Agent, or Firm*—Edward W. Callan

[57] ABSTRACT

In a multi-cavity molding apparatus that includes a cavity part having a plurality of cavity sections that is combined with a core part having a plurality of cores to define a plurality of mold cavities therebetween, and a plurality of locking rings respectively disposed around a plurality of the cores for engagement with respective cavity sections when the core part is combined with the cavity part, a cavity shield is attached to the cavity part to prevent molded products ejected from the mold cavities from entering spaces between the cavity sections of the cavity part and a core shield is attached to the core part to help prevent the ejected products from entering spaces between the cores of the core part. The cavity shield and the core shield thereby respectively limit obstruction by the cavity part and the core part of removal of the ejected products from the space between the cavity past and the core part. The core shield includes more than the ejection means.

29 Claims, 2 Drawing Sheets

APPARATUS FOR PREVENTING HINDRANCE OF REMOVAL OF MOLDED PRODUCTS FROM MOLD DUE TO CONTACT WITH MOLD PARTS

BACKGROUND OF THE INVENTION

The present invention generally pertains to molding apparatus and is particularly directed to an improvement in the removal of ejected molded products from between the mold parts of a multi-cavity molding apparatus.

Referring to FIGS. 1, 2 and 3, a prior art molding apparatus includes a cavity part 10 and a core part 12. The cavity part 10 includes a plurality of cavity sections 13, a cavity plate 14, a plurality of cavity wear rings 15, a plurality of gate inserts 16, a first runner plate 19 and a second runner plate 20. The core part 12 includes a plurality of cores 23, a core plate 24, core support pillars 26, a plurality of locking rings 27, an ejector plate 28, a plurality of ejector rods 29, and a plurality of stripper rings 30. The locking rings 27 are respectively disposed around a plurality of the cores 23 for engagement with respective cavity sections 13 when the core part 12 is combined with the cavity part 10. The ejector rods 29 attach the stripper rings 30 to the ejector plate 28.

When the cavity part 10 is combined with the core part 12 as shown in FIG. 1, a plurality of mold cavities 36 are defined respectively between the plurality of cavity sections 13 and the plurality of gate inserts 16 in the cavity part 10 and the plurality of cores 23 in the core part 12. In the apparatus shown in FIG. 1, the mold cavities 36 are defined for forming hollow plastic products 38, such as cups.

Plastic material is injected into the mold cavities 36 through a runner system 40, which extends between the first runner plate 19 and the second runner plate 20 and passes through the gate inserts 16 to the mold cavities 36. The injected plastic material solidifies in the mold cavities 36 to form a plurality of molded products 38. The cavity part 10 and the core part 12 are then separated from one another by hydraulic means (not shown).

When the cavity part 10 and the core part 12 have been sufficiently separated from one another, as shown in FIG. 2, the ejector plate 28 is protracted to move toward the space 46 between the cavity part 10 and the core part 12 in response to the force applied to the ejector plate 28 by a machine hydraulic ejection cylinder (not shown) such that the stripper rings 30 move rapidly to push the molded products (not shown) from the cores 23 and thereby eject the molded products from the core part 12 and into the space 46 between the cavity part 10 and the core part 12. The ejected molded products are blown away from the space 46 between the cavity part 10 and the core part 12 by a stream of compressed air from a source of compressed air (not shown). Sometimes, such removal of the molded products is hindered by the ejected molded products entering spaces between portions, such as the cavity sections 13, of the cavity part 10 and/or by the molded products entering spaces between the cores 23 of the core part 12.

SUMMARY OF THE INVENTION

The present invention provides a multi-cavity molding apparatus, comprising a cavity part having a plurality of cavity sections; a core part having a plurality of cores for combination with the cavity part to define a plurality of mold cavities therebetween; ejection means for ejecting a plurality of products formed in the mold cavities into a space between the cavity part and the core part when the cavity part and the core part are separated from one another; a plurality of locking rings respectively disposed around a plurality of the cores for engagement with respective cavity sections when the core part is combined with the cavity part; and shielding means disposed in relation to the cavity part and the core part for limiting obstruction by either the cavity part or the core part of removal of said ejected products from the space between the cavity part and the core part.

The present invention also provides a multi-cavity molding apparatus, comprising a cavity part having a plurality of cavity sections; a core part having a plurality of cores for combination with the cavity part to define a plurality of mold cavities therebetween; ejection means for ejecting a plurality of products formed in the mold cavities into a space between the cavity part and the core part when the cavity part and the core part are separated from one another; and core-part shielding means disposed in relation to the core part for limiting obstruction by the core part of removal of said ejected products from the space between the cavity part and the core part; wherein the core-part shielding means include means other than the ejection means.

Additional features of the present invention are described with reference to the detailed description of the preferred embodiments.

DETAILED DESCRIPTION

Figure 1:
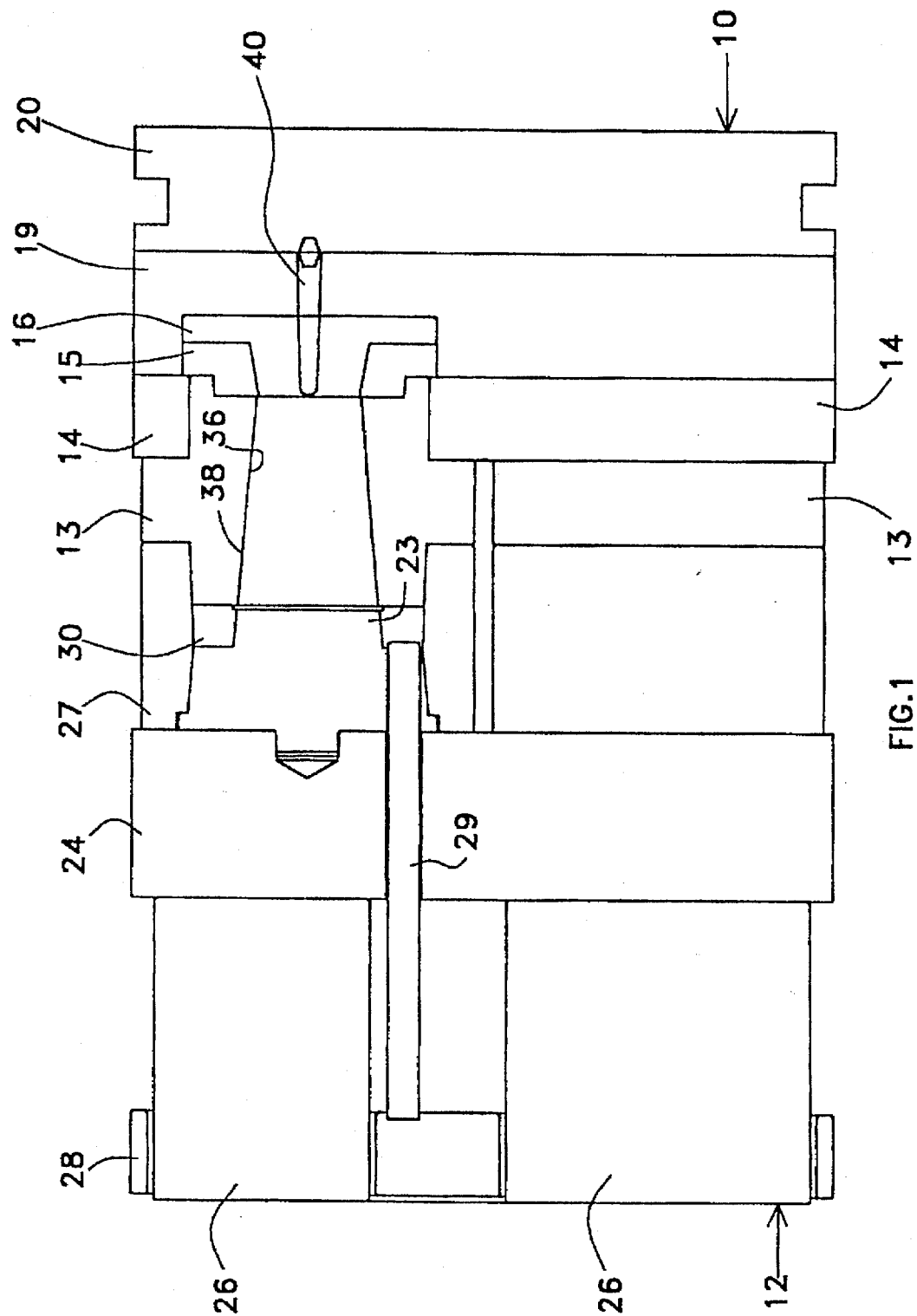
FIG. 1 is a plan view of a prior art multi-cavity molding apparatus with portions of thereof broken away to illustrate certain interior components and the operation of said apparatus. The view of FIG. 1 shows the apparatus before the cavity part and the core part are first separated from one another.
Figure 3:
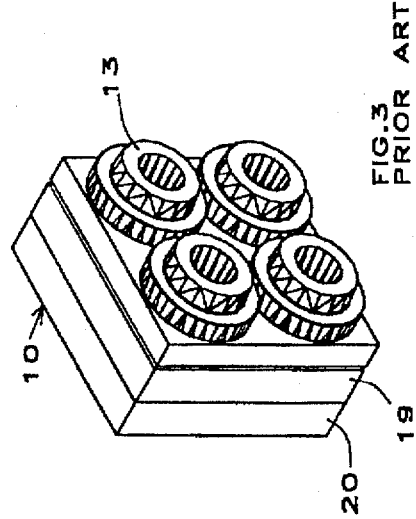
FIG. 3 is a perspective view of the opposite side of the cavity section of the prior art multi-cavity molding apparatus of FIGS. 1 and 2 from the side shown in FIG. 2.
Figure 5:
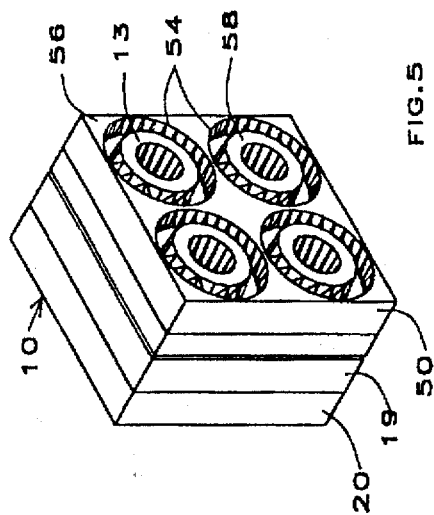
FIG. 5 is a perspective view of the opposite side of the cavity section of the multi-cavity molding apparatus of FIG. 4 from the side shown in FIG. 4.
Figure 2:
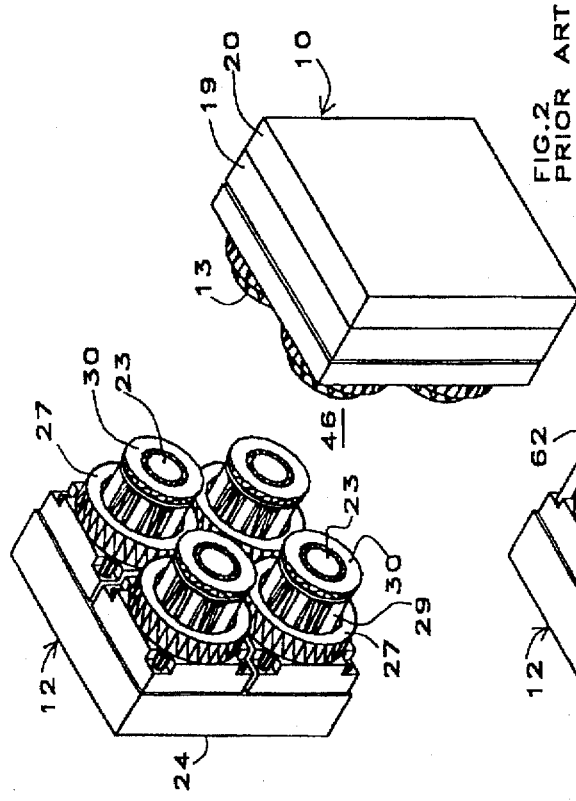
FIG. 2 is a perspective view of portions of the prior art multi-cavity molding apparatus of FIG. 1 with the cavity part separated from the core part.
Figure 4:
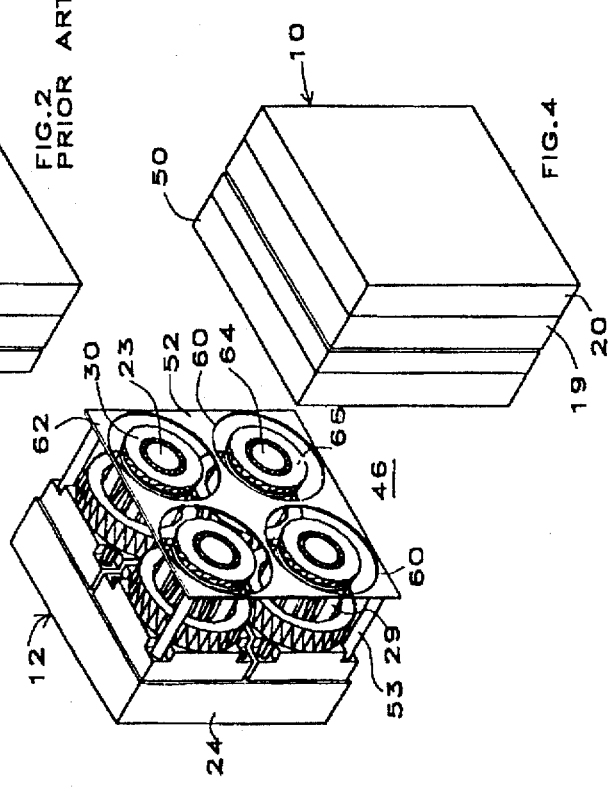
FIG. 4 is a perspective view of pertinent portions of a preferred embodiment of a multi-cavity molding apparatus according to the present invention with the cavity part separated from the core part.

Referring to FIGS. 4 and 5, a preferred embodiment of the molding apparatus of the present invention includes the components of the prior art molding apparatus described hereinabove with reference to FIGS. 1, 2 and 3 and further includes a cavity shield 50 attached to the cavity part 10 and a core shield 52 attached to the core part 12. When the core part 12 is combined with the cavity part 10, the locking rings 27 are disposed between the stripper rings 30 and the core shield 52; and the locking rings 27 are also disposed between the cavity sections 13 and the cavity shield 50.

The cavity shield 50 includes apertures 54 for exposing the cavity sections 13. The surface 56 of the cavity shield 50 is aligned approximately with a forward parting surface 58 of the cavity sections 13 and is so disposed in relation to the cavity part 10 as to prevent ejected molded products from entering spaces between the cavity sections 13 of the cavity part 10. A strong air flow is provided from within the cavity sections 13 as the molded products are being ejected from the cores 23 in order to inhibit molded products from being trapped in the cavity sections 13.

The core shield 52 is attached to the ejector plate 28 by a plurality of shield rods 53 and is disposed in approximately the same plane as the stripper rings 30 so as to be protracted together with the stripper rings 30 toward the space 46 between the cavity part 10 and the core part 12. The core shield 52 includes apertures 60 for exposing the locking rings 27, the cores 23 and the stripper rings 30. The surface 62 of the core shield 52 is aligned approximately with respective forward surfaces 64 of the cores 23 and respective forward surfaces 66 of the stripper rings 30 when the cores 23 and the stripper rings 30 are fully protracted toward the space 46 between the cavity part 10 and the core part 12. When fully protracted, the combination of the core shield 52 and stripper rings 30 are so disposed as to prevent ejected molded products 38 from entering spaces between the cores 23 of the core part 12.

The cavity shield 50 and the core shield 52 thereby limit obstruction by the cavity part 10 and the core part 12 of removal of the ejected molded products from the space 46 between the cavity part 10 and the core part 12 as the ejected molded products are being blown away from the space 46.

In an alternative preferred embodiment (not shown), the multi-cavity molding apparatus is a stack mold or a tandem molding apparatus, in winch another set of cavity sections is disposed on the second runner plate 20 and faces in a direction opposite to that faced by the set of cavity sections 13 disposed on the first runner plate 19. The set of cavity sections disposed on the second runner plate 20 shares the portion of the runner system that extends between the first runner plate 19 and the second runner plate 20. In this embodiment, a core part 12 faces each set of cavity sections 13 in the same manner as the core part 12 faces the cavity sections 13 in the preferred embodiment shown in FIG. 4.

The advantages specifically stated herein do not necessarily apply to every conceivable embodiment of the present invention. Further, such stated advantages of the present invention are only examples and should not be construed as the only advantages of the present invention.

While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

We claim:

1. A multi-cavity molding apparatus, comprising:
   a cavity part having a plurality of cavity sections;
   a core part having a plurality of cores for combination with the cavity part to define a plurality of mold cavities therebetween;
   a plurality of locking rings respectively disposed around a plurality of the cores for engagement with respective cavity sections when the core part is combined with the cavity part;
   ejection means for ejecting a plurality of products formed in the mold cavities into a space between the cavity part and the core part when the cavity part and the core part are separated from one another; and
   shielding means disposed in relation to the cavity part and the core part for limiting obstruction by the cavity part or the core part of removal of said ejected products from the space between the cavity part and the core part. from the space between the cavity part and the core part.

2. An apparatus according to claim 1, wherein the shielding means include a cavity-part shielding means disposed for inhibiting ejected products from entering spaces between portions of the cavity part.

3. An apparatus according to claim 2, wherein the cavity-part shielding means is aligned approximately with a forward parting surface of the cavity part.

4. An apparatus according to claim 1, wherein the shielding means include a core-part shielding means disposed for inhibiting ejected products from entering spaces between portions of the core part.

5. An apparatus according to claim 4, wherein the ejection means are protractible and the core-part shielding means is aligned approximately with respective forward surfaces of the cores when the ejection means are protracted.

6. An apparatus according to claim 4, wherein the core-part shielding means includes at least a portion of the ejection means.

7. An apparatus according to claim 6, wherein the portion of the ejection means included in the core-part shielding means include stripper means for contacting the products while on the cores, which stripper means are protractible for stripping the products from the cores and ejecting the products into the space between the cavity part and the core part, with the stripper means being so disposed when protracted as to help prevent ejected products from entering spaces between portions of the core part.

8. An apparatus according to claim 7, wherein the core-part shielding means further includes a shield, the apparatus comprising means for projecting the shield and the stripper means together into their respective positions for preventing ejected products from entering spaces between portion of the core part.

9. An apparatus according to claim 7, wherein the stripper means includes stripper rings.

10. An apparatus according to claim 4, comprising rods connected to the core-part shielding means for projecting the core-part shielding means into a position for preventing ejected products from entering spaces between portions of the core part.

11. An apparatus according to claim 1, wherein the ejection means are protractible and the shielding means comprise cavity-part shielding means aligned approximately with a forward parting surface of the cavity part and core-part shielding means aligned approximately with respective forward surfaces of the cores when the ejection means are protracted.

12. An apparatus according to claim 1, wherein the core-part shielding means include at least a portion of the ejection means and a shield that is separate from the ejection means.

13. An apparatus according to claim 12, wherein the shield and the ejection means are attached to a common ejector plate for protraction together.

14. An apparatus according to claim 1, wherein when the core part is combined with the cavity part, the locking rings are disposed between the ejection means and the core-part shielding means.

15. An apparatus according to claim 1, wherein when the core part is combined with the cavity part, the locking rings are disposed between the cavity sections and the cavity-part shielding means.

16. A multi-cavity molding apparatus, comprising
   a cavity part having a plurality of cavity sections;
   a core part having a plurality of cores for combination with the cavity part to define a plurality of mold cavities therebetween;
   ejection means for ejecting a plurality of products formed in the mold cavities into a space between the cavity part and the core part when the cavity part and the core part are separated from one another; and core-part shielding means disposed in relation to the core part for limiting obstruction by the core part of removal of said ejected products from the space between the cavity part and the core part;

wherein the core-part shielding means include at least a portion of the ejection means and a shield that is separate from the ejection means.

17. An apparatus according to claim 16, further comprising a plurality of locking rings respectively disposed around a plurality of the cores for engagement with respective cavity sections when the core part is combined with the cavity part.

18. An apparatus according to claim 17, wherein when the core part is combined with the cavity part, the locking rings are disposed between the ejection means and the core-part shielding means.

19. An apparatus according to claim 16, wherein the core-part shielding means is disposed for inhibiting ejected products from entering spaces between portions of the core part.

20. An apparatus according to claim 16, wherein the ejection means are protractible and the core-part shielding means is aligned approximately with respective forward surfaces of the cores when the ejection means are protracted.

21. An apparatus according to claim 16, wherein the portion of the ejection means included in the core-part shielding means includes stripper means for contacting the products while on the cores, which stripper means are protractible for stripping the products from the cores and ejecting the products into the space between the cavity part and the core part, with the stripper means being so disposed when protracted as to help prevent ejected products from entering spaces between portions of the core part.

22. An apparatus according to claim 21, wherein the core-part shielding means further includes a shield, the apparatus comprising means for projecting the shield and the stripper means together into their respective positions for preventing ejected products from entering spaces between portions of the core part.

23. An apparatus according to claim 21, wherein the stripper means includes stripper rings.

24. An apparatus according to claim 16, wherein the shield and the ejection means are connected to a common ejector plate for protraction together.

25. An apparatus according to claim 16, comprising rods connected to the core-part shielding means for projecting the core-part shielding means into a position for preventing ejected products from entering spaces between portions of the core part.

26. An apparatus according to claim 16, wherein the ejection means are protractible and the core-part shielding means are aligned approximately with respective forward surfaces of the cores when the ejection means are protracted.

27. An apparatus according to claim 16, wherein the shielding means include a cavity-part shielding means disposed for inhibiting ejected products from entering spaces between portions of the cavity part.

28. An apparatus according to claim 27, wherein the cavity-part shielding means is aligned approximately with a forward parting surface of the cavity part.

29. An apparatus according to claim 16, wherein when the core part is combined with the cavity part, the locking rings are disposed between the cavity sections and the cavity-part shielding means.

* * * * *

UNITED STATES PATENT AND TRADEMARK OFFICE
CERTIFICATE OF CORRECTION

PATENT NO. : 5,688,541
DATED : November 18, 1997
INVENTOR(S) : Paul Philip Brown et al.

It is certified that error appears in the above-identified patent and that said Letters Patent is hereby corrected as shown below:

Abstract, line 16, "past" should read --part--.

Column 1, line 23, "tings" should read --rings --.

Column 3, line 23, "winch" should read --which --.

Column 3, lines 64 and 65, "from the space between the cavity part and the core part." should be deleted.

Column 4, line 30, "portion" should read --portions --.

Signed and Sealed this

Fifteenth Day of September, 1998

Attest:

BRUCE LEHMAN

Attesting Officer

Commissioner of Patents and Trademarks